United States Patent [19]
Kluver et al.

[11] Patent Number: 5,941,168
[45] Date of Patent: Aug. 24, 1999

[54] SILAGE ROUND BALER

[75] Inventors: Leroy M. Kluver, Celina; Robert A. Stelzer, Coldwater; Eric W. Clausen, Celina, all of Ohio

[73] Assignee: AGCO Corporation, Duluth, Ga.

[21] Appl. No.: 09/060,118

[22] Filed: Apr. 14, 1998

[51] Int. Cl.⁶ .............................. B30B 5/04; A01F 15/18
[52] U.S. Cl. .................... 100/87; 56/341; 474/271
[58] Field of Search .................. 100/5, 13, 87, 100/88; 56/341, 343; 198/498, 690.2, 842; 474/167, 260, 267, 271

[56]  References Cited

U.S. PATENT DOCUMENTS

| | | | |
|---|---|---|---|
| 2,336,491 | 12/1943 | Luebben ................................. | 100/88 |
| 3,981,391 | 9/1976 | Phillips et al. . | |
| 4,088,069 | 5/1978 | Soteropulos ........................... | 100/88 |
| 4,336,750 | 6/1982 | White et al. . | |
| 4,426,926 | 1/1984 | Soteropulos et al. . | |
| 4,428,282 | 1/1984 | Anstey ................................... | 100/88 |
| 4,518,647 | 5/1985 | Morrison .............................. | 474/271 |
| 4,581,879 | 4/1986 | Anstey ................................... | 100/88 |
| 4,648,239 | 3/1987 | Geiser et al. ........................... | 100/88 |
| 4,650,068 | 3/1987 | Vanassche et al. .................... | 474/271 |
| 4,900,609 | 2/1990 | Arnold ................................... | 100/88 |
| 4,972,770 | 11/1990 | Berkers ................................. | 100/87 |
| 5,080,009 | 1/1992 | Fritz et al. . | |
| 5,097,760 | 3/1992 | Ratzlaff et al. . | |
| 5,165,333 | 11/1992 | Ratzlaff et al. ....................... | 100/88 |
| 5,182,987 | 2/1993 | Viaud ..................................... | 100/87 |
| 5,191,833 | 3/1993 | Clevenger, Jr. ....................... | 100/88 |
| 5,193,450 | 3/1993 | Anderson . | |
| 5,433,059 | 7/1995 | Kluver et al. . | |
| 5,749,289 | 5/1998 | Anderson et al. . | |
| 5,768,986 | 6/1998 | Arnold et al. . | |

FOREIGN PATENT DOCUMENTS

| | | | |
|---|---|---|---|
| 0213219 | 3/1987 | European Pat. Off. ................ | 100/88 |
| 2575362 | 7/1986 | France ................................... | 100/88 |
| 3231741 | 3/1984 | Germany .............................. | 100/88 |
| 3234455 | 3/1984 | Germany .............................. | 100/88 |

*Primary Examiner*—Stephen F. Gerrity
*Attorney, Agent, or Firm*—Biebel & French

[57]  ABSTRACT

A baler including a plurality of endless belts and opposing side walls defining therebetween a chamber for receiving forage material and forming a bale. Each of the belts is formed as a full width belt extending substantially a transverse distance from one of the side walls to the other of the side walls. In order to maintain proper tracking of the full width belts, a drive roller for each of the belts is formed with a sleeve centrally located on the drive roller and defining a crown for the roller, as well as improving traction between the roller and the belt. In addition, each of the full width belts is formed with a differential stiffness wherein the belt exhibits a greater stiffness against bending about an axis perpendicular to the rollers than the stiffness against bending about an axis parallel to the rollers. In order to facilitate removal of debris from an area adjacent to an inner surface of the belt, a roller for guiding the belt is provided with a helix structure wherein the helix acts as an auger to convey debris away from the center and toward the ends of the roller.

26 Claims, 9 Drawing Sheets

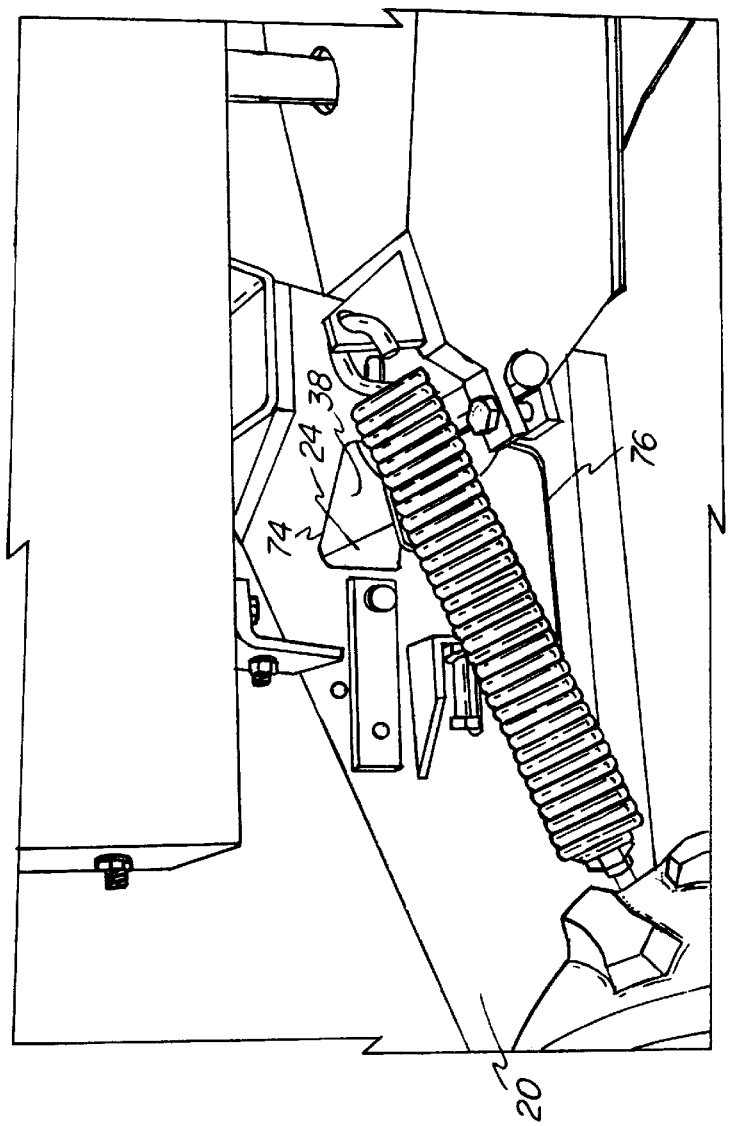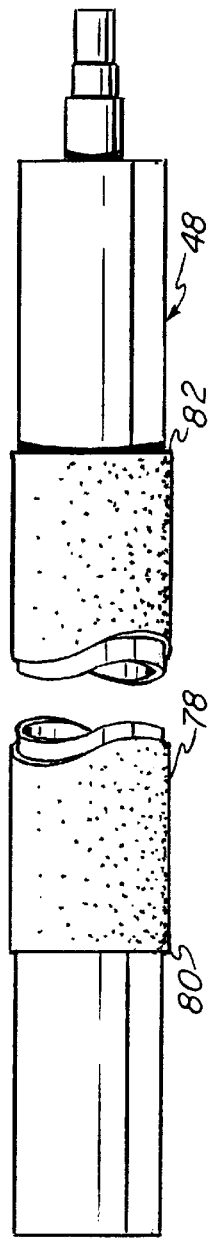

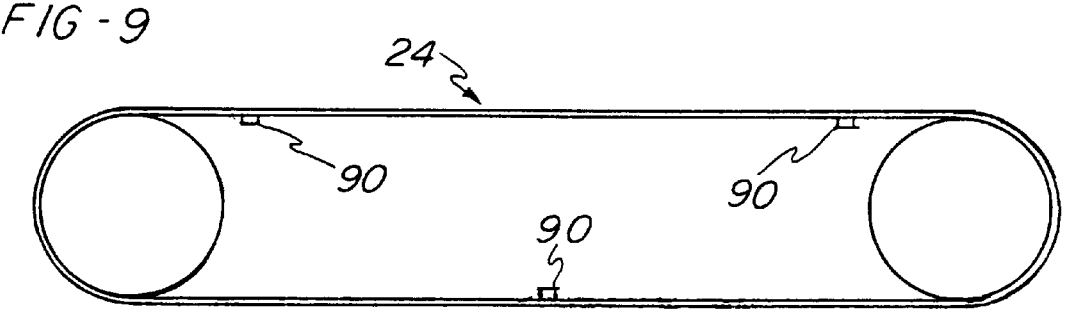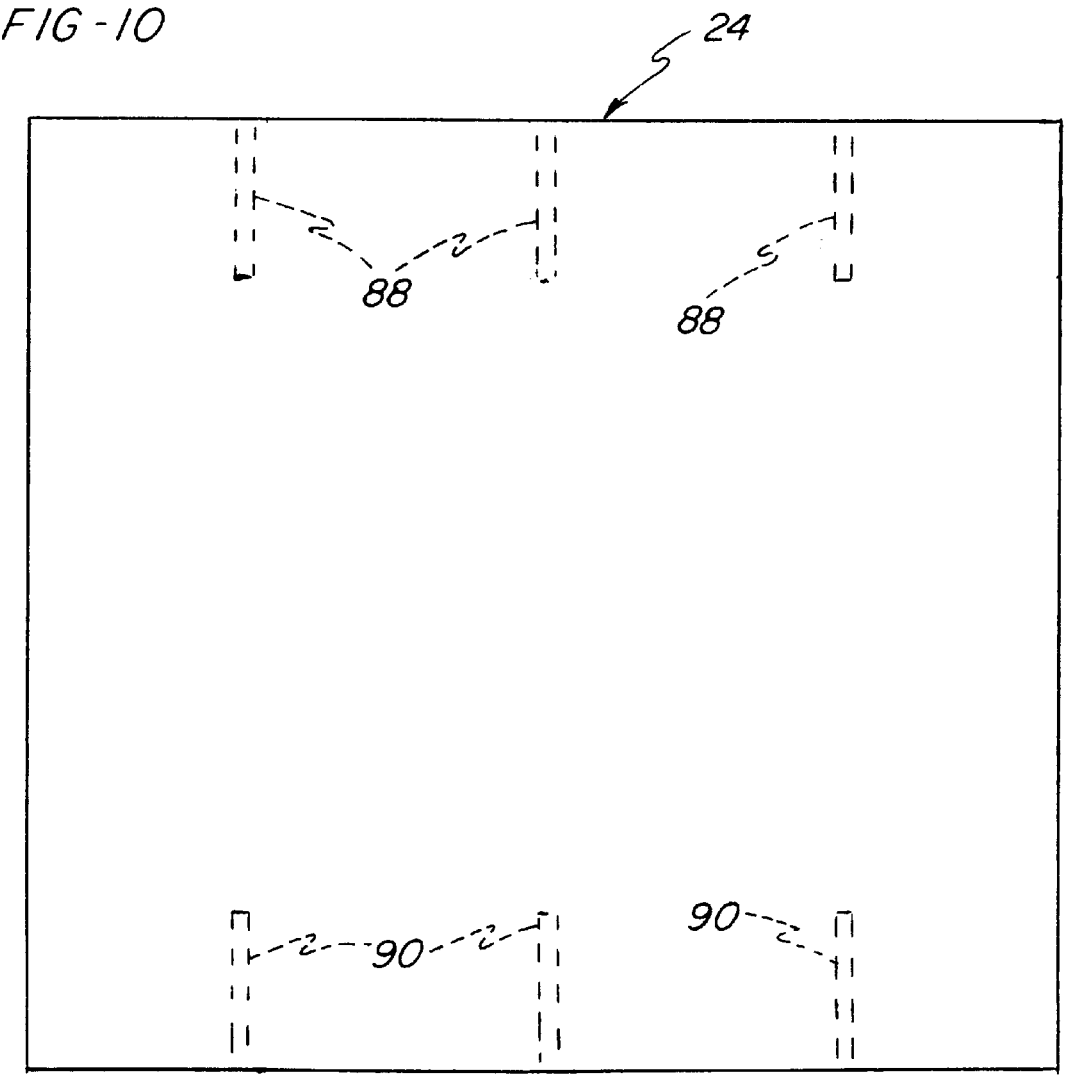

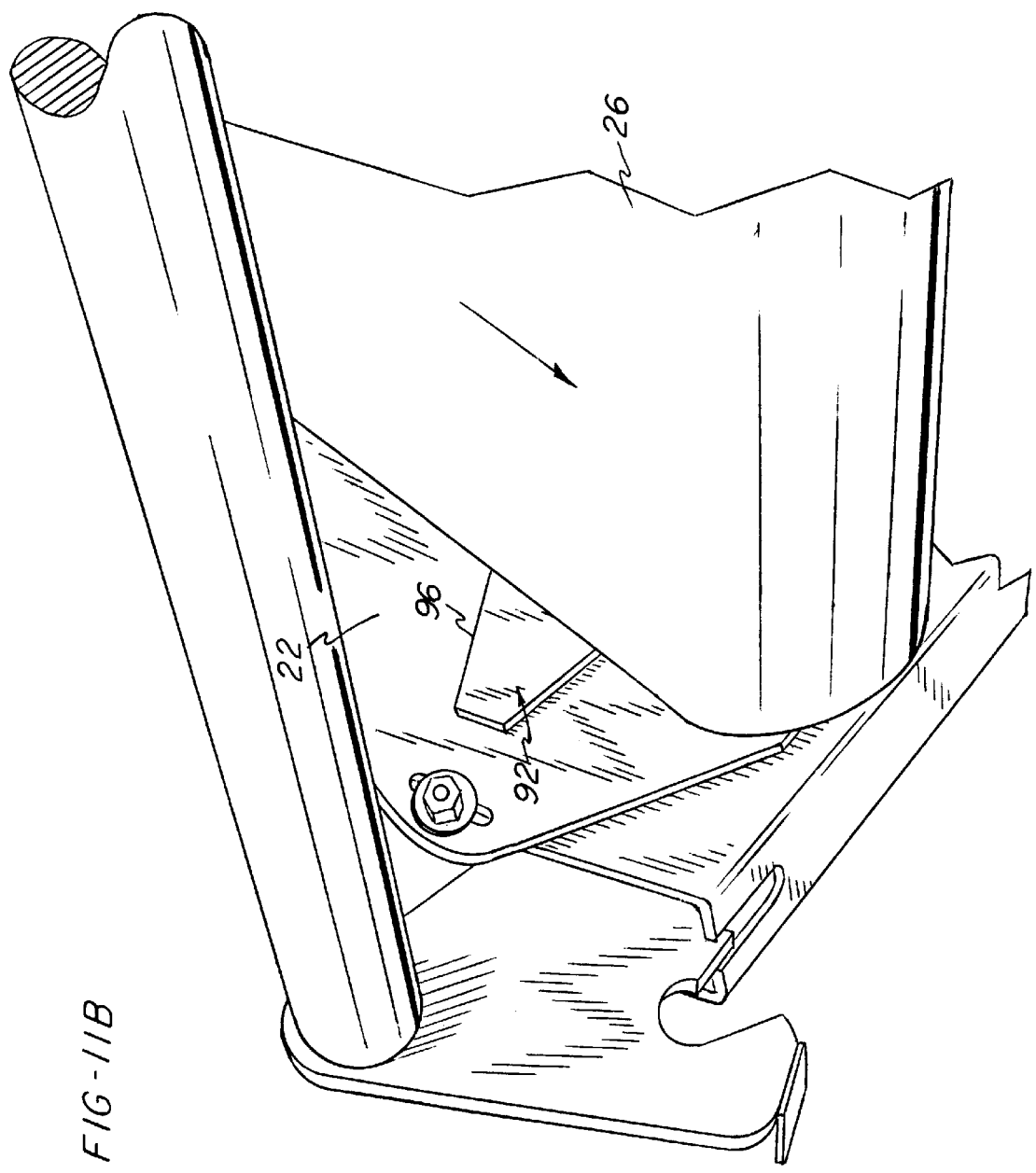

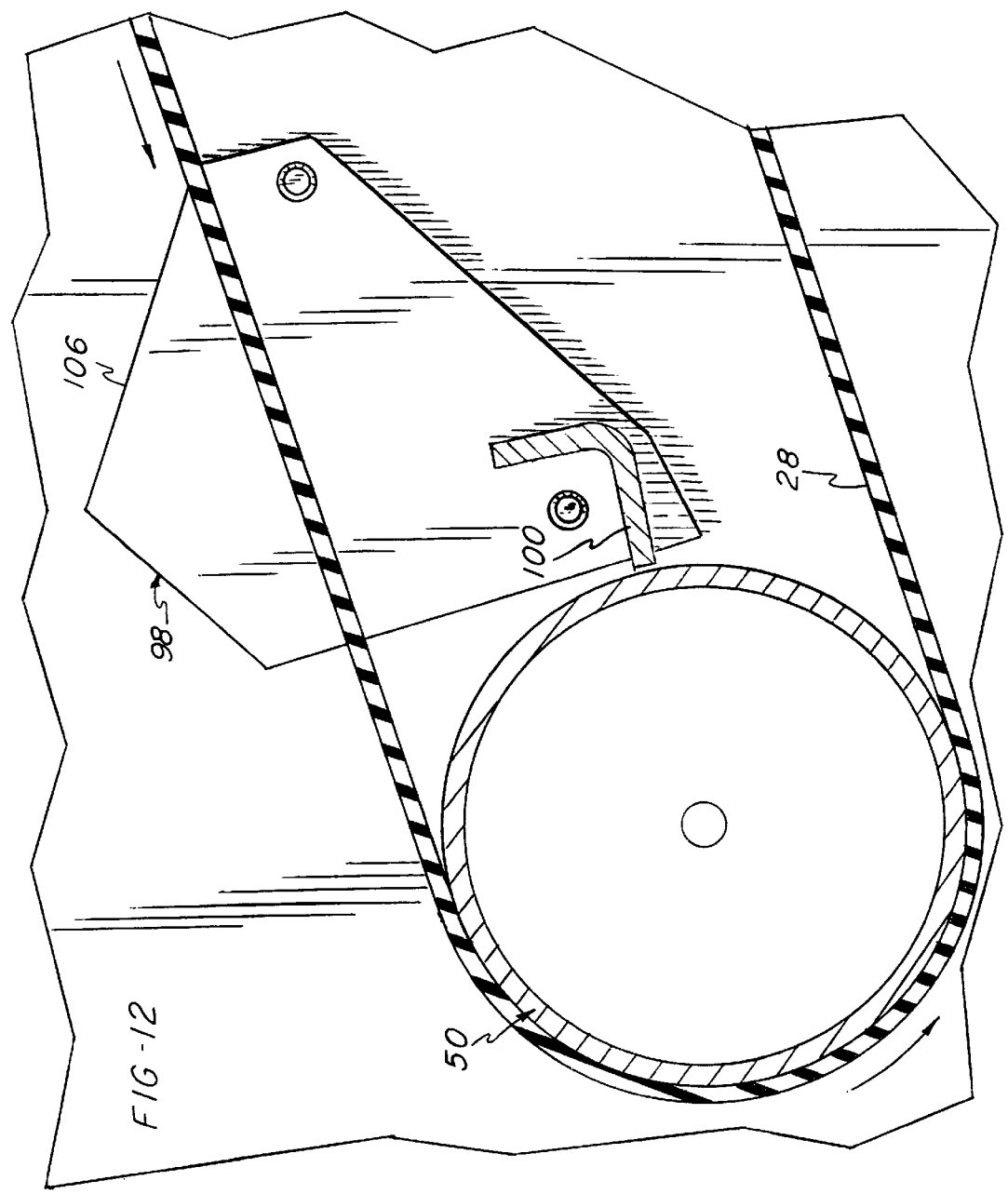

SILAGE ROUND BALER

BACKGROUND OF THE INVENTION

1. Field of the Invention

The present invention relates generally to round balers and, more particularly, to round balers for baling silage and improvements thereto to limit trash accumulation and to improve trash and residue removal from areas within the baler that tend to collect such materials during a baling operation.

2. Related Prior Art

For many years, forage crops have been preserved and/or stored in the form of bales wherein the formation of the crops into bales facilitates transportation, storage and preservation of the forage material for feeding to livestock. The forage material may be formed into either square bales or round bales depending on the storage requirements and the ultimate use of the forage crop. For example, round bales have found increased use for storage of silage and are generally more economical as a silage storage method than the conventional silage systems.

In the formation of round bales, a round baler is typically pulled by a tractor through a field of cut forage crop material and a driven pick-up mechanism on the baler feeds the forage material into a baling chamber of the baler. The baling chamber comprises belts which cause the forage material to rotate within the baling chamber, and as additional material is fed into the baler, it will build up around the material already in the chamber until a bale of predetermined size is formed. The bale is then generally wrapped with twine or a net material to maintain bale shape and compression. Upon completion of the bale, it is typically discharged from the rear of the baler and onto the ground. In addition, when the baled material is for silage, the bale is subsequently enclosed in a plastic bag or encased by overlapping layers of stretch wrap plastic in order to retain the moisture content within the bale and eliminate air interchange and thereby facilitate desirable bacterial growth and fermentation for silage-making.

The moisture content of the forage crop material required to form good round bale silage is ideally 50 to 60 percent wet basis moisture content. This moisture content is significantly higher than that of dried crop material and, as a result, there are problems in forming round silage bales which are not normally encountered in baling of dry forage materials. For example, round balers typically include a plurality of side-by-side belts which are driven around rollers encircling the baling chamber of the baler, and wet crop residue tends to be forced between the gaps in the belts. When dry crop residue moves into the pinch area between the rollers and the belts, it usually does not accumulate or tend to cause serious problems. The residue is typically ground up into smaller pieces which generally does not interfere with the operation of the machine, and eventually passes out of the machine. Wet crops, on the other hand, tend to mat together and form buildup within the machine, such that crop material passing to the inner surface of the belt will be compressed and adhered to the rollers and thereby form buildup which interferes with the efficiency of the baler. This buildup can also lead to belt damage and high roller and bearing loads. In addition, the additional moisture present in the forage may cause excessive slippage between the belts and the rollers. This also can contribute to higher horsepower consumption, and belt tracking problems and resulting belt life problems.

Accordingly, there is a need for a baler for forming silage bales wherein the baler is adapted to minimize buildup of debris and trash passing into the contact or pinch areas between the rollers and belts, and which provides improved traction between the belts and rollers for driving the belts. Further, there is a need for a baler which efficiently operates to ensure that any trash or debris accumulating adjacent to the inner surfaces of the belts is discharged to facilitate efficient operation of the belts.

SUMMARY OF THE INVENTION

The present invention is directed to a round baler which is particularly designed for baling hay silage, and which may advantageously also be used for baling of dried hay materials. More particularly, the present invention is directed to an improved belt support system for use in a round baler wherein the belt support system prevents buildup of residue material along the inner surfaces of the belts and cooperating roller surfaces for the baler.

The round baler of the present invention includes a plurality of endless belts and opposing sidewalls wherein a baling chamber is defined between the opposing side walls and the endless belts. The baling chamber is adapted to receive forage material for forming a bale, and each of the belts is supported on a plurality of rollers extending between the opposing side walls wherein the belts are driven to rotate the forage material in a predetermined direction within the baling chamber during a bale forming operation.

The belts comprise full width belts extending substantially the entire transverse distance between the two side walls of the baler. The full width belt of the present invention replaces the plurality of belts located across the width of the baler, as used in the prior art. The full width belt minimizes the amount of forage material passing from the outer surface of the belt into contact with the inner surface of the belt contacting the rollers and thereby minimizes debris or trash buildup along the belt driving surfaces of the baler.

Each of the belts is driven by a drive roller having a sleeve member located centrally between opposite ends of the roller. The sleeve is preferably formed of a material which increases friction with the belt, such as rubber, which also improves tracking of the full width belt. In addition, the sleeve forms a centrally located crown on the drive roller wherein the crowning effect of the sleeve against the belt further improves tracking to minimize lateral movement of the belt, such as might occur when the belt is unevenly loaded across the width of the belt during a bale forming operation or when crop material runs between the inside surface of the belt and the corresponding rollers.

In addition, debris which passes into the area of the inner surface of the belt tends to accumulate adjacent to at least one of the rollers for each of the belts. A mechanism is provided for moving debris outwardly to the edges of the belt where the debris may fall through gaps between the belt edges and the side walls of the baler. In particular, rollers located at the areas where debris tends to accumulate are provided with a helix structure wherein cooperation between the helix and the inner surface of the belt operates to work the debris outwardly to the opposing ends of the rollers.

In order to prevent the edges of the belts from rolling over across the top surface of the belts, in the event that the belt edges contact the sides of the baler and built up crop material, the belts are constructed with a differential stiffness wherein a greater force is required to bend the belt about an axis extending along the length of the belt than a force required to bend the belt about an axis extending parallel to the rollers (i.e., along the width of the belt). The differential stiffness is provided by an internal structure of the belt including filament material comprising stiffening fibers extending transverse to the length of the belt. The fibers extending transverse to the length of the belt have a greater stiffness than the fibers defining a warp extending parallel to the length of the belt such that the transversely extending fibers present a sufficient resistance to bending to prevent belt edge rollover.

Therefore, it is an object of the present invention to provide a round baler which minimizes debris or trash build up in the area of the inner surfaces of the belts of the baler.

It is a further object of the invention to provide such a round baler incorporating full width belts to minimize debris movement into the area of the inner surface of the belts.

It is yet another object of the invention to provide a round baler with full width belts and including an efficient means for maintaining tracking of the belts.

It is an additional object of the invention to provide a round baler including belt guiding rollers which are adapted to work debris from the inner area of the belt and thereby facilitate cleaning of the areas defined by the inner surfaces of the belts.

Other objects and advantages of the invention will be apparent from the following description, the accompanying drawings and the appended claims.

BRIEF DESCRIPTION OF THE DRAWINGS

FIG. 5 is a view of one of the lower outside walls of the baler showing debris discharge slots;

FIG. 6 is a front view of one of the drive rollers;

FIGS. 9 and 10 are side elevational and plan views, respectively, of a belt for the baler, and illustrating the construction of the cleats on the inner surface of the belt;

FIG. 11B is a perspective view of the rear of the baler showing the bracket of FIG. 11A as it extends outwardly past the belt;

FIG. 12 is a side elevational view of a roller stripper and supporting bracket for the top belt.

DETAILED DESCRIPTION OF THE PREFERRED EMBODIMENT

Figure 1:
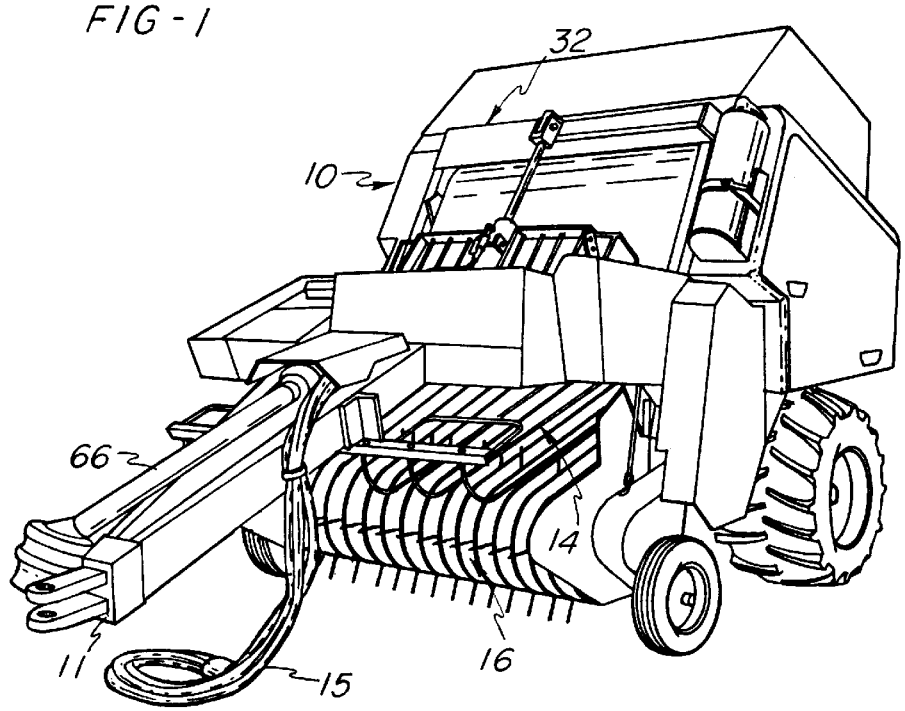
FIG. 1 is a perspective view of a baler incorporating the belt support system of the present invention.
Figure 2:
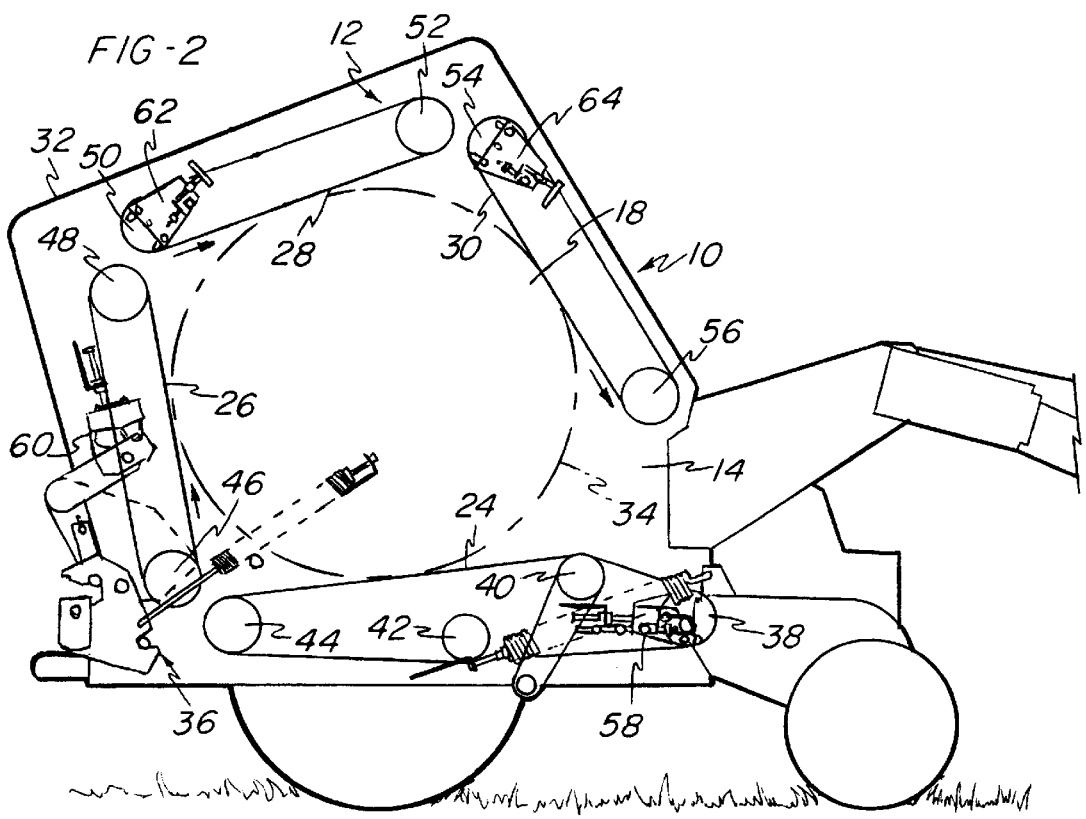
FIG. 2 is a side elevational diagrammatic view of the baler of FIG. 1.

Referring initially to FIGS. 1 and 2, a baler 10 incorporating the belt support system 12 of the present invention is illustrated wherein the baler preferably comprises a fixed chamber round baler. The baler 10 includes a hitch 11 for connection to a tractor, a power take-off driveline 66 for connection to the power take-off shaft of a tractor, and hydraulic and electrical lines 15 for connection to the hydraulic and electrical system of a tractor. In addition, the baler 10 includes an open throat 14 and a conventional pick up mechanism 16 for feeding forage crop material from the ground to the open throat 14, after which the forage material is fed into a baling chamber 18.

The baling chamber 18 is defined between opposing side walls 20 and 22 (see FIGS. 3 and 4), and is surrounded by a plurality of driven belts 24, 26, 28 and 30 (FIG. 2). The chamber 18 is configured to form a bale 34, which is illustrated as partially formed in FIG. 2. In addition, the baler 10 includes a pivoted tailgate section 32 which, upon completion of a bale 34 in the baling chamber 18, will pivot upwardly in a known manner to discharge the bale 34 from the rear of the baler 10 onto the ground. The tailgate section 32 is held closed during the baling operation by a latch mechanism 36, located at the rear of the baler 10 and which operates in a conventional manner to facilitate regulating the density of the bale 34 formed in the chamber 18.

As best seen in FIG. 2, the belt support system 12 of the present invention includes a plurality of rollers supporting each of the belts 24, 26, 28, 30. In particular, the belt 24, forming a bottom belt for the baler 10, is supported by idler rollers 38, 40, 42, and by drive roller 44. The belt 26, forming a rear belt for the baler 10 is supported on idler roller 46 and drive roller 48. The belt 28, forming a top belt for the baler 10 is supported on an idler roller 50 and on a drive roller 52, and the belt 30, forming a front belt for the baler 10, is supported on an idler roller 54 and on a drive roller 56. Appropriate tension on the belts 24, 26, 28, 30 is provided through adjustment mechanisms 58, 60, 62 and 64 associated with respective idler rollers 38, 46, 50 and 54 to move the idler rollers in a conventional manner whereby the belt tension is maintained to avoid slippage of the belts and to prevent excessive loading on the bearings and rollers. Further, the drive rollers 44, 48, 52 and 56 are driven by a drive mechanism including a conventional chain and gear drive system driven by the power take-off shaft 66 of the baler 10.

Figure 3:
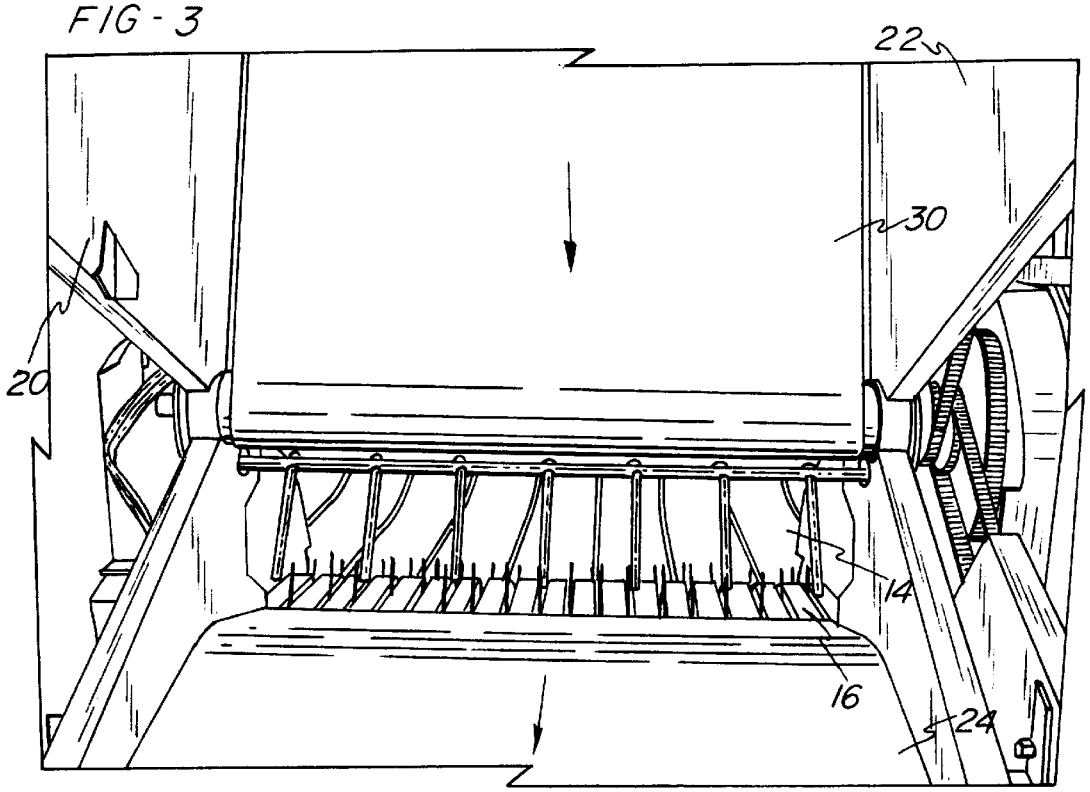
FIG. 3 is a view from the rear of the baler with the tailgate section opened and showing the bottom and front full width belts.

Referring further to FIG. 3, the baler 10 of the present invention is illustrated with the tailgate section 32 in an open position, and it may be seen that the baler 10 incorporates full width belts which extend substantially the entire transverse distance between the side walls 20 and 22, as illustrated by the bottom belt 24 and the front belt 30. The full width belts 24, 26, 28, 30 of the baler 10 each include side edges which are spaced a predetermined small distance from the adjacent side walls 20, 22, and are preferably spaced with a gap of approximately 1 inch on each side thereof.

The present baler 10 is particularly adapted for baling silage materials, and the full width belts 24, 26, 28, 30 enable the baler 10 to process the forage materials and minimize the amount of material that is passed from the baling chamber 18 into the area of the inner surfaces of the belts where they contact their respective rollers. This is accomplished by eliminating the gaps found on the majority of balers currently on the market which incorporate a plurality of laterally spaced belts, which each of the full width belts of the present invention replaces. In particular, it should be understood that as a bale within the baler 10 is increasingly compacted, large forces are produced pushing outwardly against the belts, and that such forces will tend to squeeze material past any openings in the area of the belt surfaces, such that the present construction incorporating full width belts is designed to substantially limit the effects of compaction forces pushing material past the belts. However, while minimizing the amount of material which moves through to the inner surfaces of the belts, the full width belts similarly tend to limit the ability of material located within the area adjacent to the inside surfaces of the belts to be removed or passed out of the baler 10.

Figure 4:
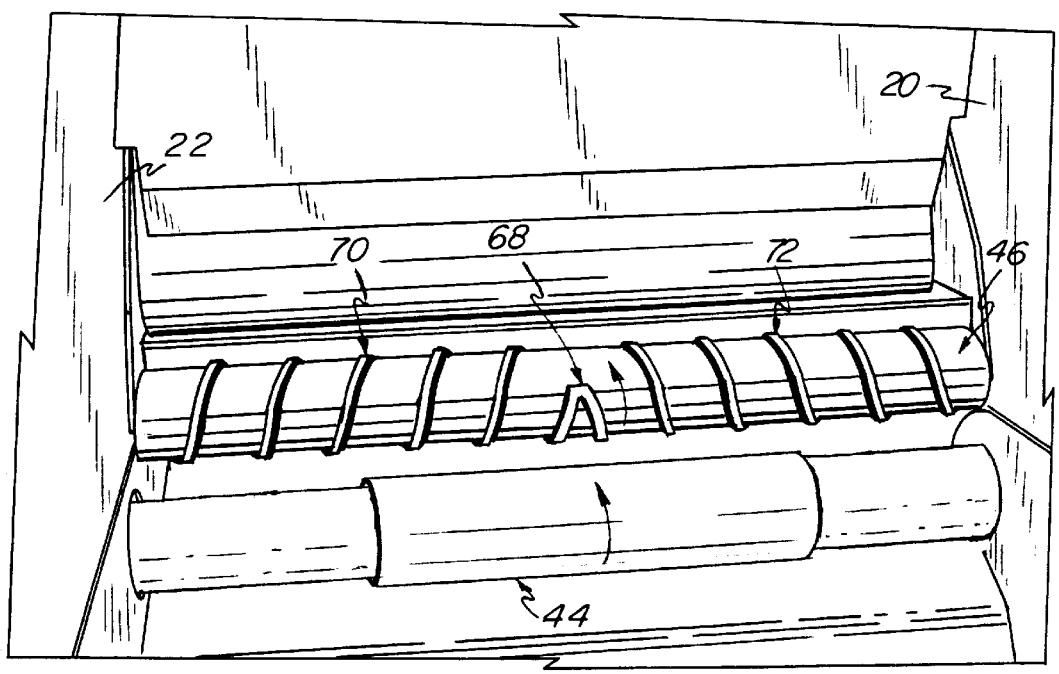
FIG. 4 is a view from the front of the baler into the baling chamber with the bottom and rear belts removed to show the drive roller for the bottom belt and the idler roller for the rear belt.

In accordance with the present invention, a simple and efficient mechanism is provided for removing debris from the area inside the belts. Referring to FIG. 4, in which the belts have been removed to better view the rollers, the idler roller 46 illustrates the trash removal mechanism of the present invention which comprises a helix structure 68 located on the outer cylindrical surface of the roller 46 and including two oppositely directed pitches defined by left-hand helical portion 70 and right-hand helical portion 72 configured to convey material from the center of the roller 46 outwardly toward either end thereof with rotation of the roller 46. The opposite pitches of the helixes 70, 72 also introduces a balanced or canceling loading influence on the belt tracking. The helix structure 68 has a pitch of approximately four inches, and is formed by welding steel strips around the outer surface of the roller 46. Further, it should be noted that the rollers 56 and 38 are provided with a similar helix structure to that described for roller 46, and that each of the rollers 38, 46 and 56 are positioned at locations where debris will tend to accumulate within the belts 24, 26, 30. In particular, debris will tend to move downwardly toward the rollers 46 and 56 within their respective belts 26 and 30, and the lower run of the belt 24 will tend to convey debris forwardly to the roller 38. It may also be noted that either one of the rollers 50 or 52 for the belt 28 could also be provided with a similar helix structure if debris accumulation within this belt should require a removal mechanism.

Referring further to FIG. 5, the sidewall 22 of the baler 10 adjacent to the idler roller 38 for the lower belt 24 is illustrated. An upper slot 74 and lower slot 76 are provided to permit debris to pass out of the side of the baler as it is conveyed by the two helixes on the roller 38. In addition, similar slots are provided on the opposite sidewall 20, and the slots 74, 76 may also be utilized for easy inspection of the roller 38 and inner surface of the belt 24, as well as to allow passage of a tool to the inner surface of the lower belt 24 to facilitate loosening and/or removal of any debris that may collect at the roller 38.

The wide belts used in the present baler have a low length to width ratio, or aspect ratio, and such low aspect ratio belts tend to have greater difficulty in tracking than narrow belts having higher aspect ratios. In other words, as the width of the belt increases in relation to the length of the belt, there is a greater tendency for the belt to wander side to side, rather than tracking straight parallel to the longitudinal direction of the belt. In the present embodiment of the invention, the lower belt 24 has a length to width ratio of approximately 2.25 to 1 and the rear, top and front belts 26, 28 and 30 have a length to width ratio of approximately 1.6 to 1.

In order to provide controlled tracking of each of the belts 24, 26, 28, 30, each of the drive rollers 44, 48, 52, 56 is provided with a sleeve 78 located centrally on its respective drive roller, as illustrated by the roller 48 in FIG. 6 which includes a sleeve 78. The sleeve 78 includes opposing ends 80, 82 which are spaced inwardly from the side walls 20, 22 and from the ends of the drive roller 48. In addition, it can be seen that the sleeve 78 extends radially outwardly from the cylindrical surface of the drive roller 48 and thereby provides a crowning effect to the drive roller 48. Further, the sleeve 78 is formed from a different material than the steel cylindrical surface of the drive roller 48 to increase frictional forces between the drive roller 48 and the inner surface of its respective belt 26. Preferably, the sleeve 78 is formed of a rubber material and the increased traction between the rubber material of the sleeve 78 and the inner surface of the belt 26 acts to prevent belt slippage to thereby improve tracking of the belt 26 by limiting its lateral or sideways movement as it travels around the rollers. Thus, by providing a crowning effect and improved traction at the center of the drive rollers, the present invention provides for improved tracking for centering of the wide belt required for the present round baler 10.

Figure 7:
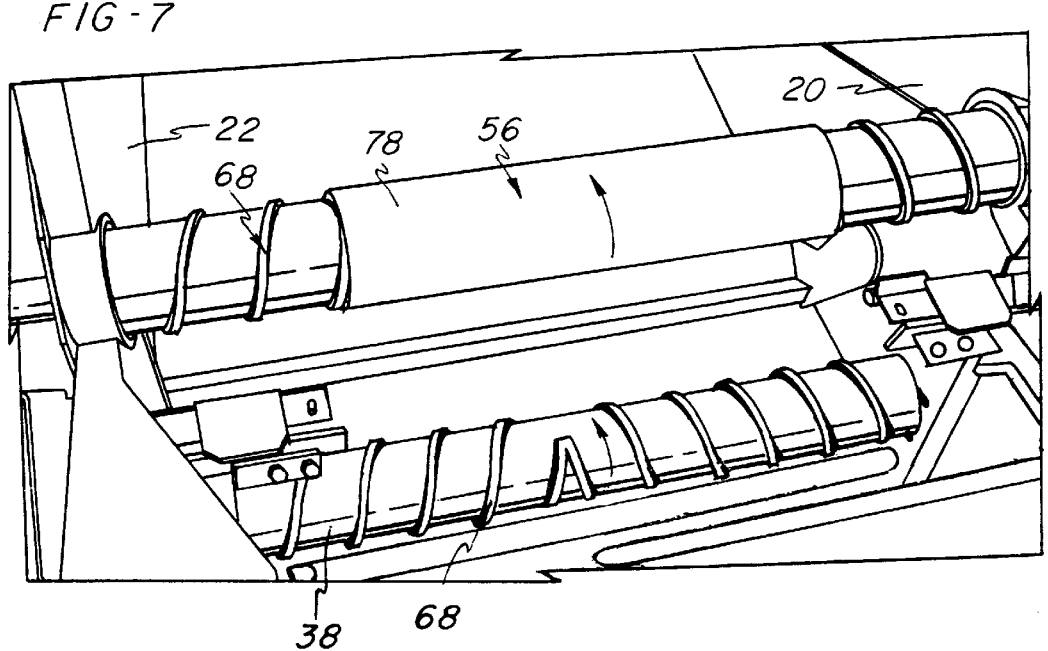
FIG. 7 is a view from the front of the baler into the baling chamber with the belts removed to show the drive roller for the front belt and the forward idler roller for the bottom belt.

Referring further to FIG. 7, it should be noted that the drive roller 56 is configured differently than the drive rollers 44, 48, 52 in that the roller 56 includes both a sleeve 78 and a helix structure 68 comprising left and right hand helixes extending from either end of the sleeve 78 to the ends of the roller 56. It should be noted that the sleeve 78 for each of the drive rollers 44, 48, 52, 56 extends approximately 55% of the length of the drive roller 56, such that approximately 45% of the length of the roller 56 is exposed for conveying debris outwardly toward the ends of the roller.

Figure 8A:
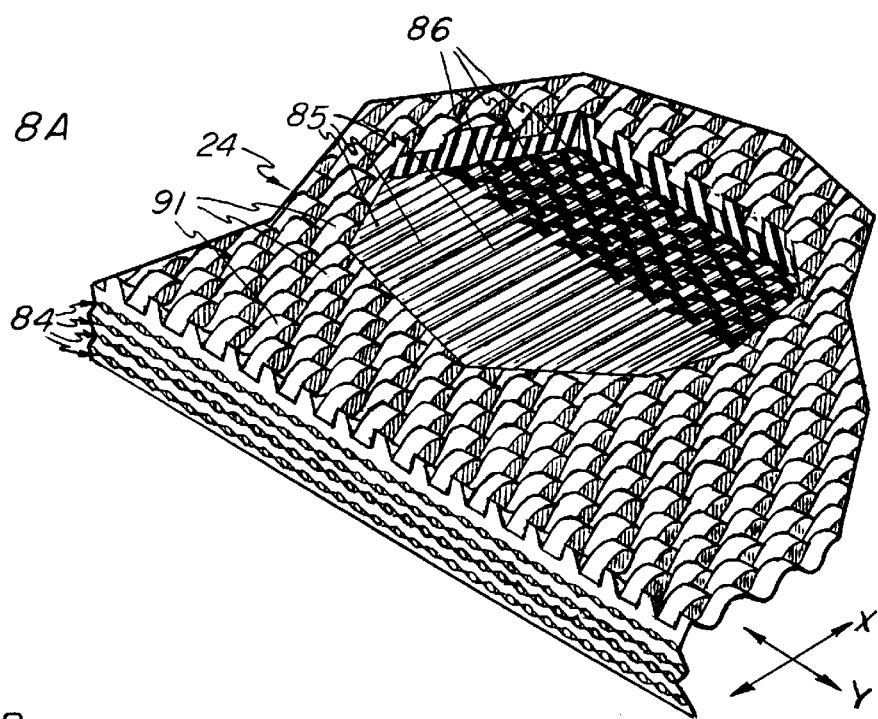
FIG. 8A is a partially cut away view of a section of one of the belts illustrating a ply layer for the belt.
Figure 8B:
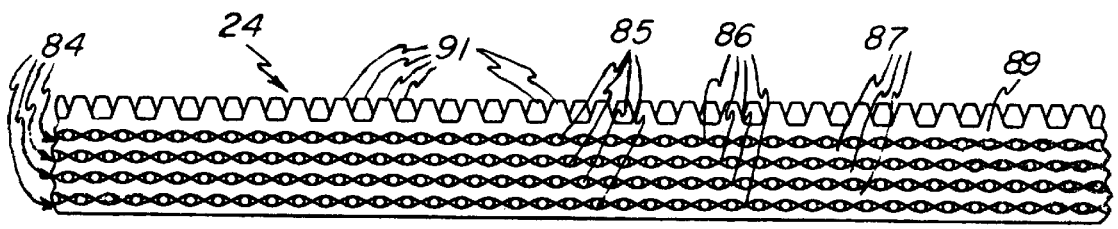
FIG. 8B is a side elevational view of a section of the belt.

Referring to FIGS. 8A and 8B, a construction for the wide belts 24, 26, 28, 30 of the present invention is illustrated with particular reference to the lower belt 24. The belt 24 has a differential stiffness in a direction X parallel to the rollers as compared to a direction Y perpendicular to the rollers such that a greater force is required to bend the belt about an axis extending in the Y direction than a force required to bend the belt about an axis extending in the X direction. The differential stiffness of the belt 24 permits the belt to easily bend around the rollers as it is driven along its length, while preventing rollover of the edges of the belt 24 if either edge should contact an adjacent side 20, 22 of the baler 10 or be exposed to any crop material buildup at the belt edges.

The belt 24 is formed of a rubber material layered between fabric plies and is formed as an endless belt without any widthwise extending seams in order to ensure durability of the belt and avoid failures. The differential stiffness of the belt 24 is produced by a particular belt construction including a plurality of layers or plies 84 having a differential stiffness. Specifically, each ply 84 is formed of relatively thick or heavy polyester monofilament cross members 85 extending widthwise of the belt 24, and nylon tensile members 86, preferably 105 pound nylon warp, extending lengthwise of the belt 24. Thus, each ply 84 is formed as a woven layer wherein the nylon tensile members 86 comprise the warp and the polyester monofilament cross members 85 comprise the fill for the weave, such that the relatively flexible nylon members 86 provide relatively little resistance to bending and provide the desired belt stretch characteristics while the relatively stiff thick polyester members 85 are relatively resistant to bending. The material characteristics of the flexible nylon members 86 are particularly important for limiting undesired overloading of the belts, as well as overloading of the rollers and bearings.

Further, in order to produce the desired transverse stiffness in the belt 24, three or four plies are provided. The plies are bonded to each other by thin layers 87 of rubber. In addition, the upper or outside surface 89 of the belt 24 is formed of rubber and defines a surface impression 91 forming a textured surface for facilitating frictional engagement with the forage material forming the bale without resulting in a buildup of this material on the belt.

It should be noted that as a result of the greater stiffness of the belt edges against flexing, the present belt construction further facilitates tracking of the belt in that the belt edges may contact the sidewalls 20, 22 of the baler, or crop material at the ends of the bale, to hold the belt against further sideways movement without the possibility of the belt edge rolling over on top of the outer surface of the belt. Further, it should be understood that the other belts 26, 28, 30 are provided with an identical construction to that described for the lower belt 24.

Referring further to FIGS. 9 and 10, the belt 24 is also formed with sets of cleats 88, 90 extending transversely across the inner surface of the belt 24. The cleats 88, 90 engage and sweep forage material toward the helix 68 on the respective roller 38, and also function to help break up the material. Further, it should be noted that the cleats 88, 90 do not extend the full length of the belt 24, but include a centrally located gap for permitting the cleats 88, 90 to pass on either side of the sleeve 78 for the drive roller 44. Also, the sets of cleats 88, 90 are spaced along the belt in the Y direction such that only one of the drive and idler rollers 44 and 38 are engaging a set of cleats 88, 90 at any given time in order to avoid excess tension on the belt 24 resulting from the cleats 88, 90 riding over the roller.

The shorter belts 26 and 30 are provided with cleats similar to those provided to the belt 24, but may be provided with fewer sets of cleats. It should be noted that if the sets of cleats are equally spaced in the longitudinal direction around the belt 24, it is preferable to provide an odd number of sets, such as one or three sets. If an even number of sets, such as two sets, is provided, both sets would simultaneously engage and climb over the rollers, resulting in a sudden, substantial increase in the belt tension, as well as an increase in the load applied to the rollers and bearings, which is not desirable in that such spikes in the applied load can produce accelerated wear of the belt, rollers, and bearings. Of course, two sets of cleats could be provided if they are not spaced half way around the belt from each other, and therefore engage the rollers at different times. The number of cleats provided for any given belt may be selected to provide for efficient sweeping of any debris located within the interior of the belt to thereby facilitate efficient removal of the debris by the helixes on the rollers 38, 46 and 56.

Figure 11A:
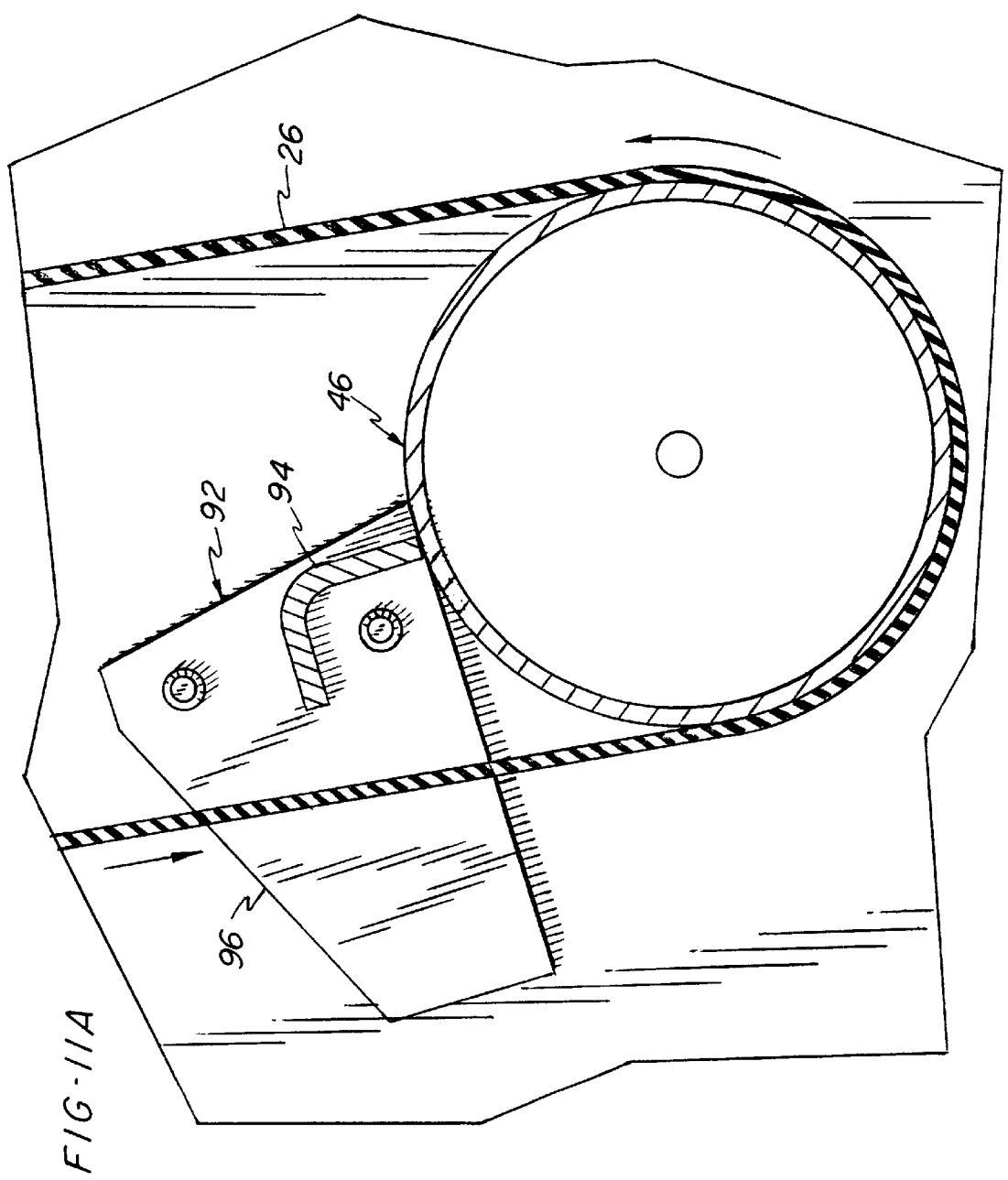
FIG. 11A is a side elevational view of a roller stripper and supporting bracket for the rear belt.

Referring to FIGS. 11A and 11B, a further mechanism for controlling debris is illustrated and comprises brackets 92 (only one shown) mounted on either wall 20, 22 adjacent to the roller 46 for the rear belt 26. The brackets 92 are provided for supporting a conventional roller stripper 94 of known construction for stripping debris from the roller 46, and includes an elongated side 96 oriented at an angle relative to the path of travel of the belt 26. The angle of the side 96 is such that it will direct debris outwardly away from the belt 26 as the debris comes into engagement with the angled side 96.

Figure 13:
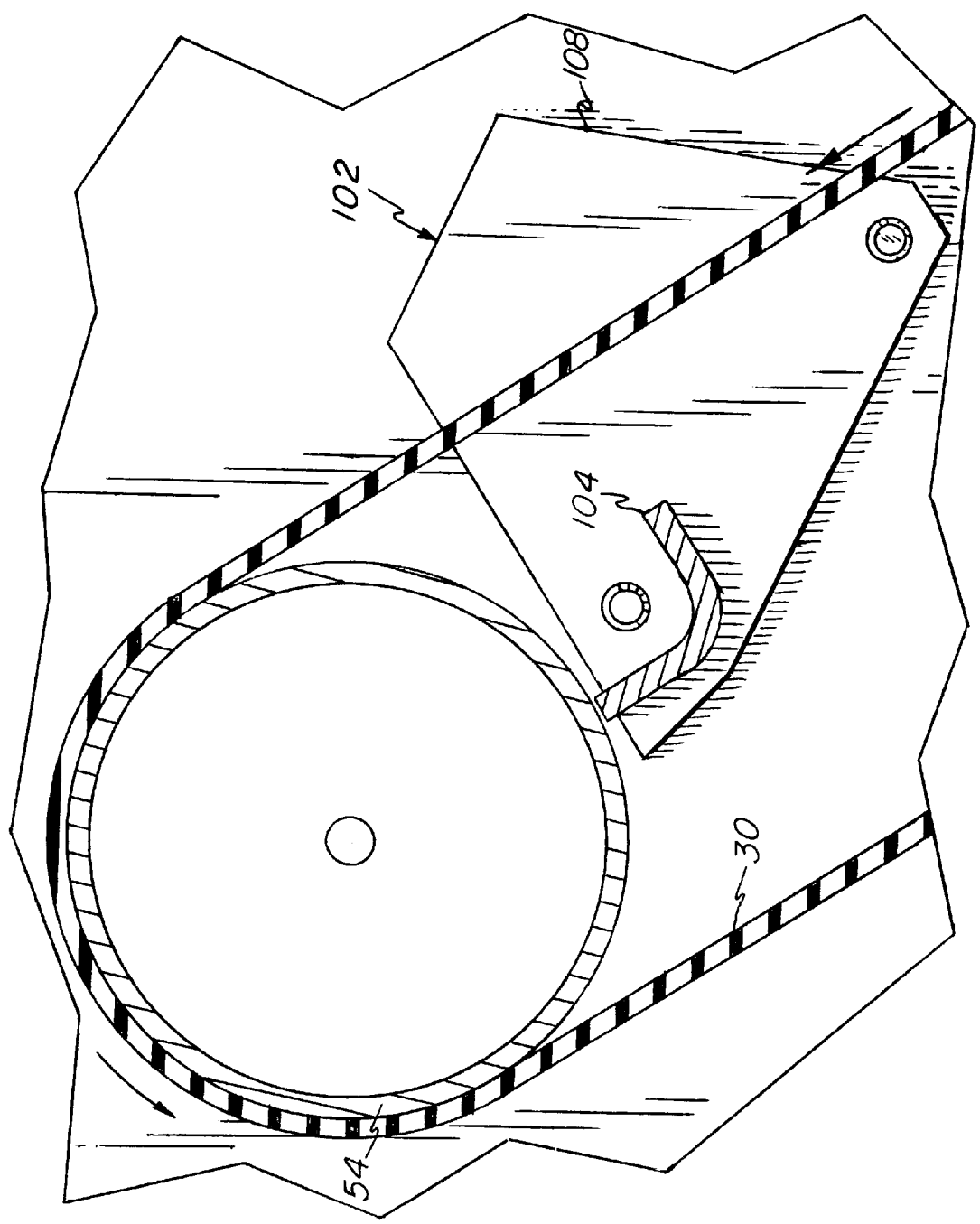
FIG. 13 is a side elevational view of a roller stripper and supporting bracket for the front belt.

Referring to FIGS. 12 and 13, the rollers 50 and 54 are provided with brackets and strippers 98, 100 and 102, 104, respectively. The bracket 98 is provided with an elongated side 106 which is angled in the direction of travel of the belt 28 to thereby guide debris outwardly from the belt 28. Similarly, the bracket 102 includes an angled elongated edge 108 for guiding debris outwardly from the belt 30. Thus, the brackets 92, 98, 102 are configured to further facilitate discharge of debris from the area around the sides of the belts.

From the above description, it should be apparent that the present invention provides a baler incorporating an efficient system for producing round bales from silage material. Further, a belt system is provided for the present baler incorporating full width belts wherein controlled tracking of the belts is provided through a combination of drive roller design and belt construction specific to the needs of the present full width belt. Also, additional roller modifications, including a provision of a helix construction, ensure that debris build up is minimized in the areas inside of the belt where debris tends to accumulate due to gravity, belt travel direction, and bale compaction forces tending to force material past the sides of the belts.

It should also be noted that although the present baler is described with particular reference to the formation of silage bales, i.e., bales formed from forage materials having a high moisture content ideally in the range of 50–60 percent wet basis moisture content, the present baler also provides for efficient baling of hay materials having a low moisture content of 20 percent or less wet basis moisture content, which provides a particular advantage over prior art balers. Specifically, prior balers designed for baling silage materials generally include gaps, either between belts or between rollers for forming and compacting the bales, and the gaps found in these balers would permit the most valuable part of hay crops, such as the leafy portion of alfalfa, to be lost whereas the full width belts of the present baler operate to retain such portions of the hay material in the baling chamber. Also, the use of full width belts eliminates the belt gaps and belt dividers used in prior art round balers incorporating plural laterally spaced belts, which gaps and belt dividers have been a source of trash hang up leading to problems in formation and wrapping of the bales, such as when net wrapping is provided around the exterior of the bale at the end of the baling operation.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a baler having a plurality of belts and opposing side walls defining therebetween a chamber for receiving forage material and forming a bale, each of said belts supported on a plurality of rollers extending between said opposing side walls, a belt support system for at least one of said belts comprising:

a full width belt extending substantially a transverse distance from one of said side walls to the other of said side walls, said full width belt having an inner surface and an outer surface;

a drive roller and an idler roller in engagement with said inner surface of said full width belt wherein said drive roller drives said full width belt in longitudinal movement around said idler roller; and a sleeve located centrally on said drive roller, said sleeve including opposing ends spaced inwardly from ends of said drive roller and from said side walls and said sleeve extending radially outwardly from a substantially cylindrical surface of said drive roller.

2. The apparatus of claim 1 wherein said sleeve is formed of a different material than said drive roller to increase frictional forces between said drive roller and said inner surface of said belt.

3. The apparatus of claim 2 wherein said sleeve is formed of a rubber material.

4. The apparatus of claim 1 wherein said sleeve defines a cylindrical surface extending parallel to said substantially cylindrical surface of said drive roller.

5. The apparatus of claim 1 wherein said sleeve extends approximately 55 percent of the length of said drive roller.

6. The apparatus of claim 1 wherein said full width belt has a differential stiffness in a direction parallel to the rollers as compared to a direction perpendicular to the rollers such that a greater force is required to bend the belt about an axis extending perpendicular to the rollers than a force required to bend the belt about an axis extending parallel to the rollers.

7. The apparatus of claim 6 wherein said full width belt comprises a fabric material with a monofilament material embedded therein to give the belt said differential stiffness.

8. The apparatus of claim 7 wherein said filament material comprises fibers of a predetermined diameter extending through said belt in a direction transverse to the length of said belt, and including a tensile warp material extending parallel to the length of said belt and interwoven with said fibers.

9. The apparatus of claim 1 wherein at least one of said drive roller or said idler roller includes a helix structure located in engagement with said belt for conveying loose forage material in a direction parallel to the length of said at least one roller.

10. The apparatus of claim 9 wherein said helix structure is configured to convey material from the center outwardly toward either end of said at least one roller.

11. In a baler having a plurality of belts and opposing side walls defining therebetween a chamber for receiving forage material and forming a bale, each of said belts supported on a plurality of rollers extending between said opposing side walls, a belt support system for at least one of said belts comprising:

a full width belt extending substantially a transverse distance from one of said side walls to the other of said side walls, said full width belt having an inner surface and an outer surface;

a drive roller and an idler roller in engagement with said inner surface of said full width belt wherein said drive roller drives said full width belt in longitudinal movement around said idler roller; and a helix structure formed on at least one of said drive roller and said idler roller for cooperating with said inner surface of said belt to convey loose forage material in a direction parallel to the length of said at least one roller.

12. The apparatus of claim 11 wherein said helix structure extends substantially the entire length of said at least one roller.

13. The apparatus of claim 11 wherein said helix structure includes left and right hand helixes comprising oppositely directed pitches to convey material from the center outwardly toward either end of said at least one roller while introducing a balanced loading influence on belt tracking.

14. The apparatus of claim 11 wherein said helix structure has a pitch of approximately 4 inches.

15. The apparatus of claim 11 including at least one transversely extending cleat formed on said inner surface of said belt for engaging and sweeping said forage material toward said helix on said at least one roller.

16. The apparatus of claim 11 wherein said drive roller includes a sleeve located centrally between opposing ends thereof, said helix extending longitudinally along said drive roller between said sleeve and said opposing ends of said drive roller.

17. The apparatus of claim 11 wherein said side walls include at least one opening adjacent to an end of said at least one roller for passage of forage material out of said baler.

18. In a baler having a plurality of belts and opposing side walls defining therebetween a chamber for receiving forage material and forming a bale, each of said belts supported on a plurality of rollers extending between said opposing side walls, a belt support system for at least one of said belts comprising:

a full width belt extending substantially a transverse distance from one of said side walls to the other of said side walls, said full width belt having an inner surface and an outer surface;

a drive roller and an idler roller in engagement with said inner surface of said full width belt wherein said drive roller drives said full width belt in longitudinal movement around said idler roller; and wherein said full width belt has a differential stiffness in a direction parallel to the rollers as compared to a direction perpendicular to the rollers such that a greater force is required to bend the belt about an axis extending perpendicular to the rollers than a force required to bend the belt about an axis extending parallel to the rollers, and said full width belt comprises fabric material with a monofilament material embedded therein to give the belt said differential stiffness.

19. The apparatus of claim 18 wherein said full width belt includes heavy monofilament fibers to provide said differential stiffness.

20. The apparatus of claim 18 wherein said monofilament material comprises fibers of a predetermined diameter extending through said belt in a direction transverse to the length of said belt, and including a tensile warp material extending parallel to the length of said belt and interwoven with said fibers to define a woven layer.

21. The apparatus of claim 20 including a plurality of woven layers, each woven layer formed of transversely extending heavy monofilament fibers and tensile warp material.

22. The apparatus of claim 20 wherein said fibers comprise heavy polyester monofilament fibers and said tensile warp material comprises nylon.

23. The apparatus of claim 18 including a sleeve on said drive roller, said sleeve formed of a material to increase frictional forces between said drive roller and said inner surface of said belt.

24. The apparatus of claim 23 wherein said sleeve extends radially outwardly from said drive roller to create a crowning effect to facilitate tracking said belt to the center of said drive roller.

25. The apparatus of claim 18 wherein at least one of said drive roller and said idler roller includes a helix formed on a belt engaging surface thereof for conveying loose forage material outwardly toward either end of said at least one roller.

26. The apparatus of claim 18 including a roller stripper supported adjacent said idler roller and including a supporting bracket, said supporting bracket including an elongated side adjacent said belt and angled outwardly in the direction of travel of said belt whereby debris will move outwardly from said belt as it engages said elongated side.

* * * * *